US009049748B2

United States Patent
Lee et al.

(10) Patent No.: US 9,049,748 B2
(45) Date of Patent: Jun. 2, 2015

(54) METHOD AND DEVICE FOR TRANSMITTING AND RECEIVING DATA IN RADIO ACCESS SYSTEM THAT SUPPORTS MULTI-RADIO ACCESS TECHNOLOGY

(75) Inventors: Eunjong Lee, Anyang-si (KR); Heejeong Cho, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 13/991,155

(22) PCT Filed: Dec. 2, 2011

(86) PCT No.: PCT/KR2011/009331
§ 371 (c)(1),
(2), (4) Date: May 31, 2013

(87) PCT Pub. No.: WO2012/074336
PCT Pub. Date: Jun. 7, 2012

(65) Prior Publication Data
US 2013/0252608 A1     Sep. 26, 2013

Related U.S. Application Data

(60) Provisional application No. 61/418,869, filed on Dec. 2, 2010, provisional application No. 61/422,665, filed on Dec. 14, 2010.

(51) Int. Cl.
*H04W 4/00* (2009.01)
*H04W 88/06* (2009.01)
*H04W 48/16* (2009.01)

(52) U.S. Cl.
CPC .............. *H04W 88/06* (2013.01); *H04W 48/16* (2013.01)

(58) Field of Classification Search
CPC ..... H04W 48/16; H04W 48/18; H04W 48/20; H04W 88/06
USPC .......................................... 455/434
See application file for complete search history.

(56) References Cited

U.S. PATENT DOCUMENTS

2004/0219926 A1* 11/2004 Kim et al. ................ 455/452.2
2005/0111419 A1*  5/2005 Kwon et al. ................ 370/338

(Continued)

FOREIGN PATENT DOCUMENTS

KR    10-2007-0046012    5/2007
KR    10-2009-0004896    1/2009

(Continued)

*Primary Examiner* — Rafael Pérez-Gutiérrez
*Assistant Examiner* — Mark G. Pannell
(74) *Attorney, Agent, or Firm* — Lee, Hong, Degerman, Kang & Waimey

(57) ABSTRACT

In a radio access system for supporting multi-radio access technology (RAT), the present invention provides a method for allowing a terminal to transmit and receive data with a first base station for supporting a first RAT and a second base station for supporting a second RAT, and the method comprises the steps of: receiving, from said first base station, a first message which indicates scanning execution for said second base station; allowing said first message to include control information which is necessary for the scanning execution of said second base station, and executing the scanning for said second base station on the basis of said control information; and transmitting, to said first base station, a multi-RAT scan report message which contains the result of the scanning execution for said second base station.

10 Claims, 8 Drawing Sheets

(56) References Cited

U.S. PATENT DOCUMENTS

| | | | |
|---|---|---|---|
| 2005/0215279 A1* | 9/2005 | Shim et al. | 455/550.1 |
| 2007/0206561 A1* | 9/2007 | Son et al. | 370/346 |
| 2008/0212509 A1* | 9/2008 | Kim et al. | 370/312 |
| 2008/0247377 A1* | 10/2008 | Van Horn et al. | 370/348 |
| 2009/0022054 A1* | 1/2009 | Kim et al. | 370/235 |
| 2009/0046657 A1* | 2/2009 | Kim et al. | 370/331 |
| 2009/0135805 A1* | 5/2009 | Lee et al. | 370/350 |
| 2009/0279503 A1* | 11/2009 | Chin et al. | 370/331 |

FOREIGN PATENT DOCUMENTS

| | | | |
|---|---|---|---|
| KR | 10-2010-0025582 | 3/2010 | |
| WO | WO 2009/113782 A2 * | 9/2009 | H04W 36/14 |

* cited by examiner

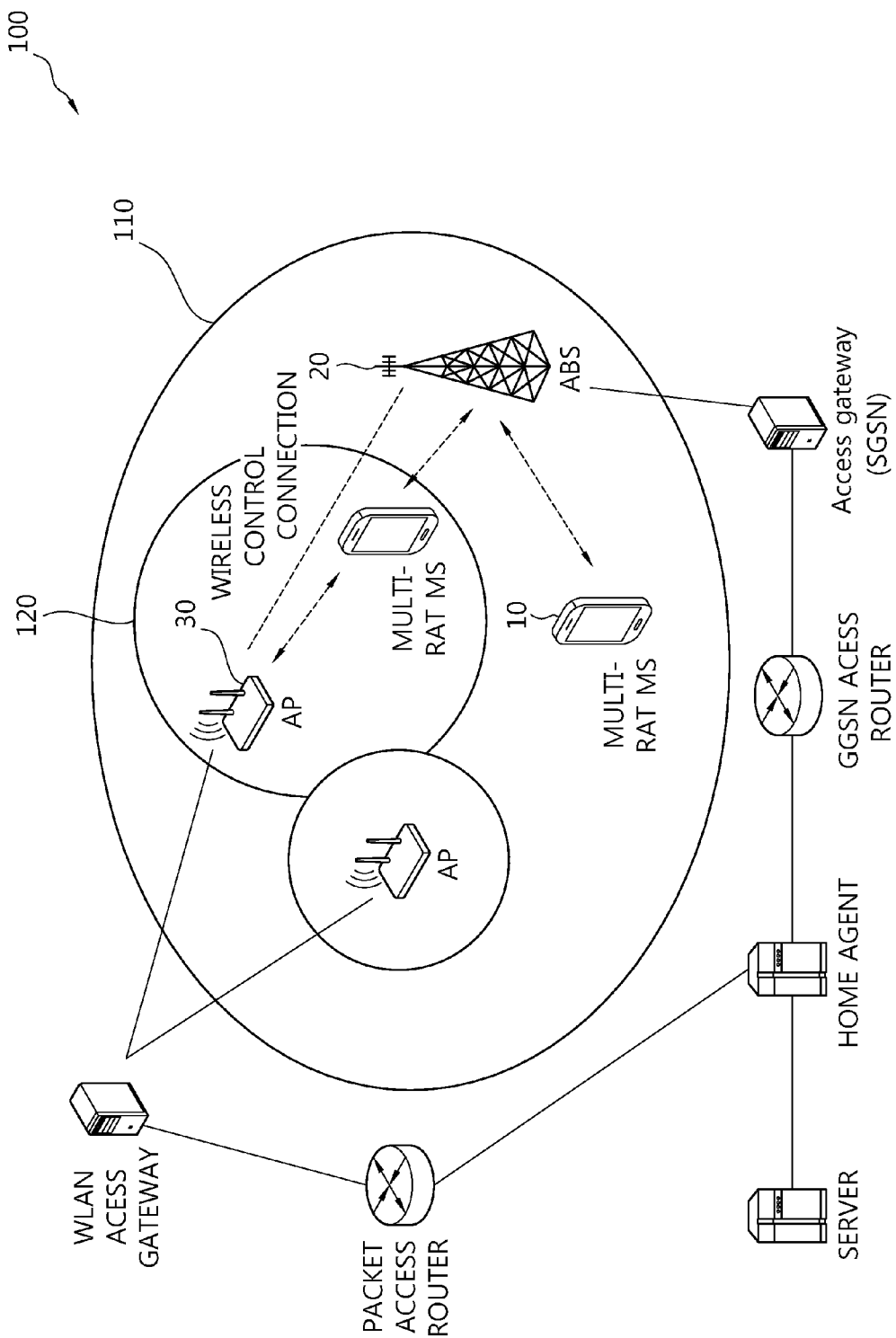

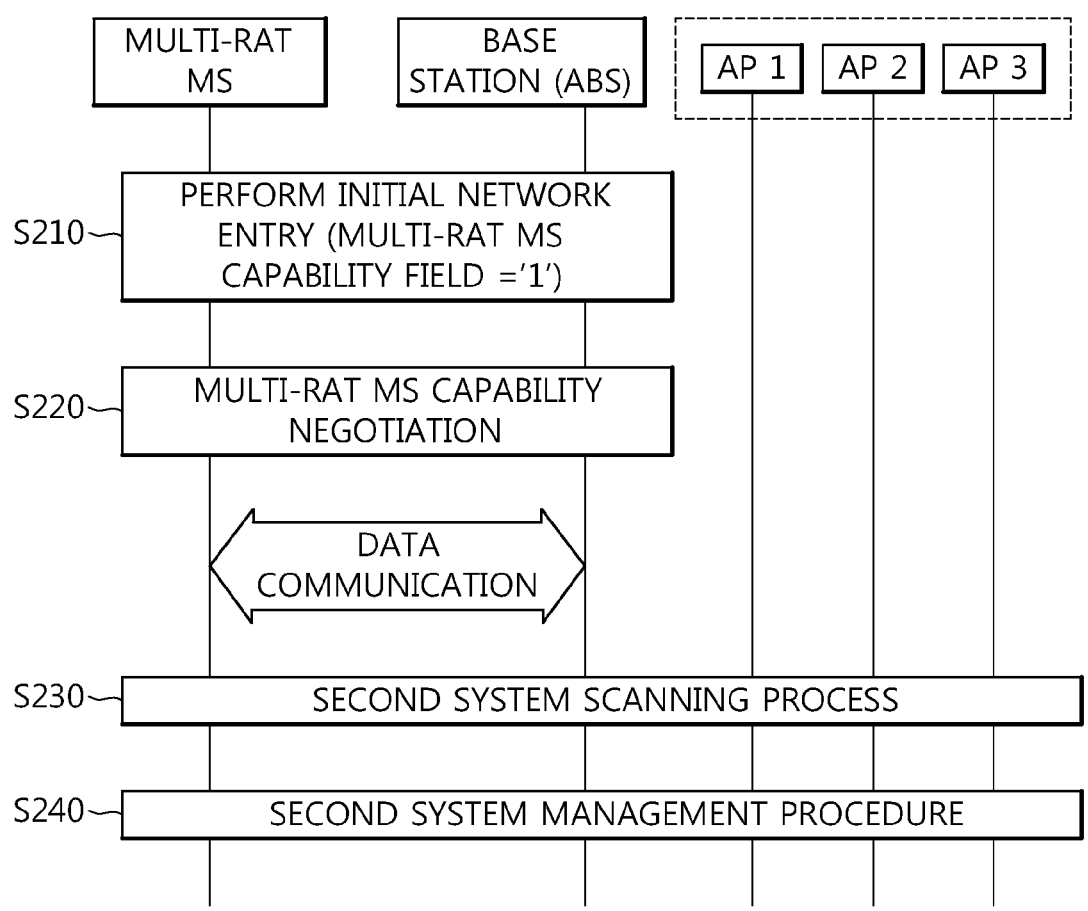

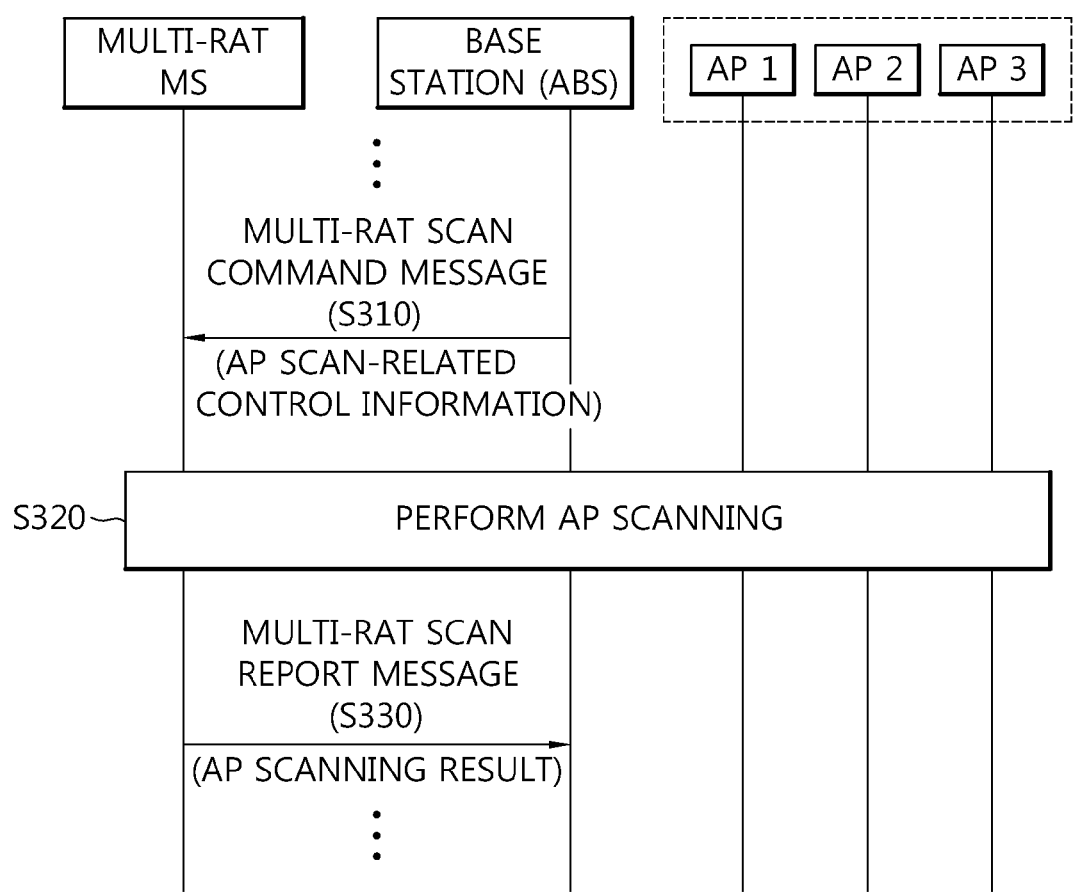

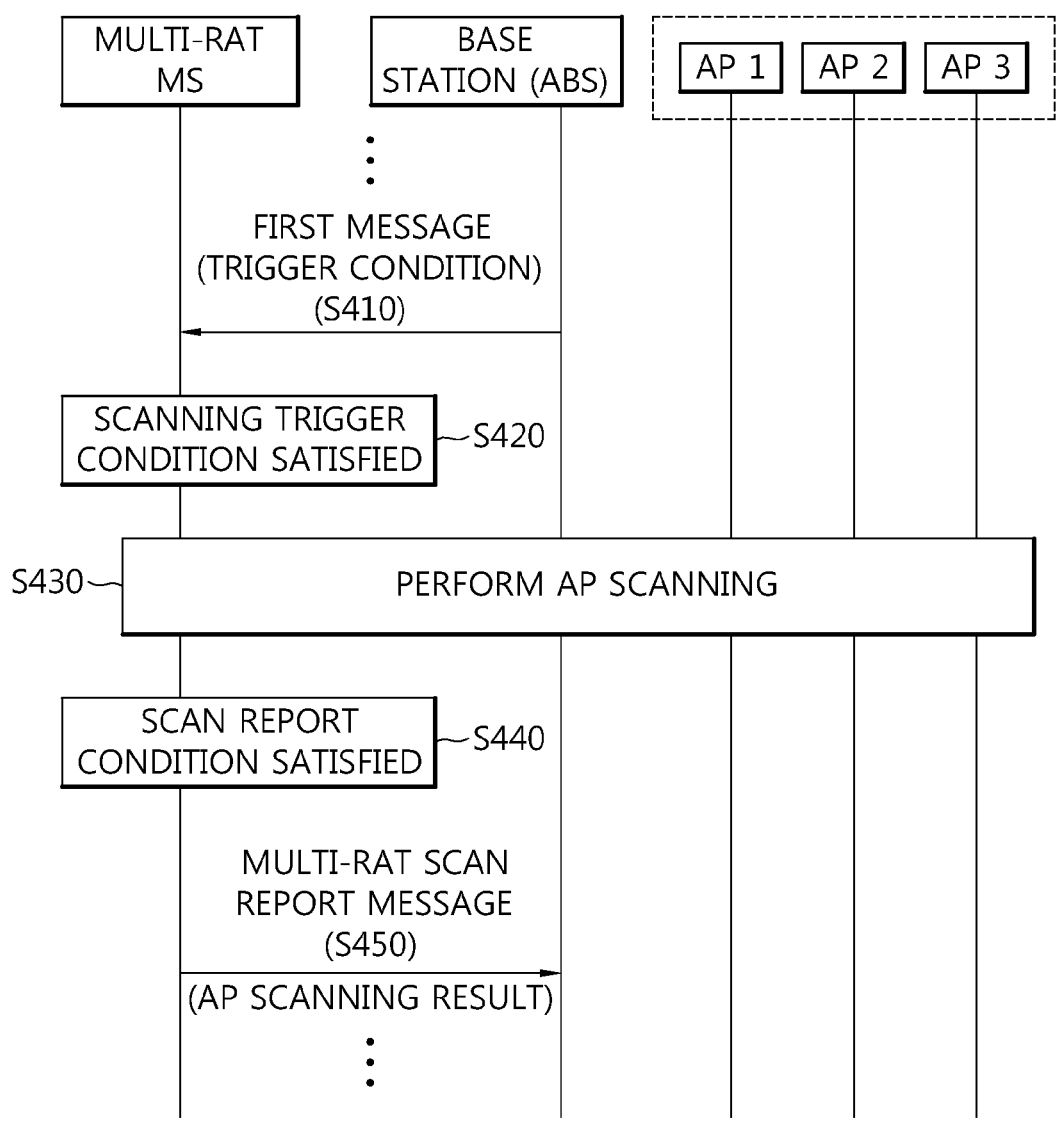

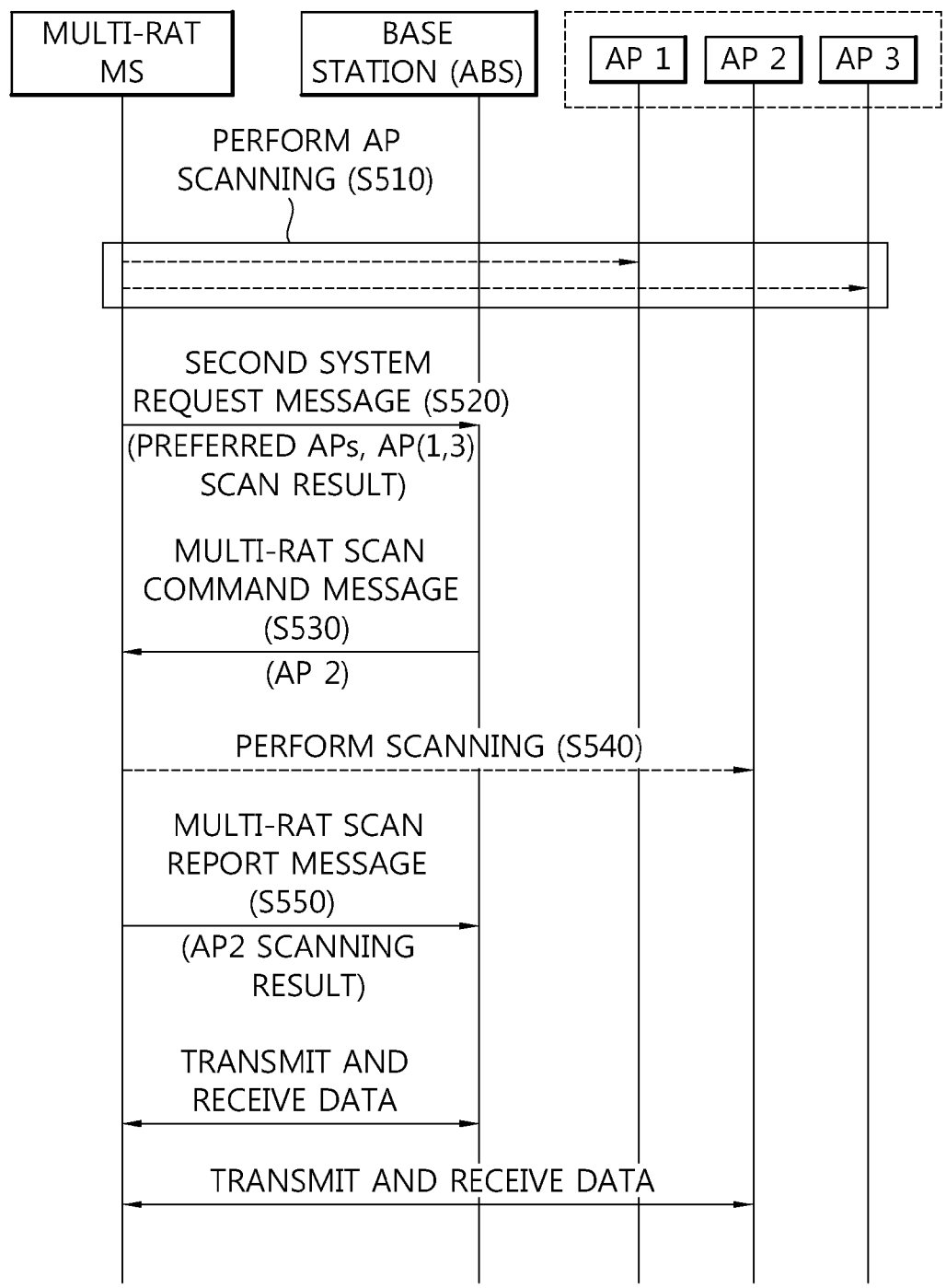

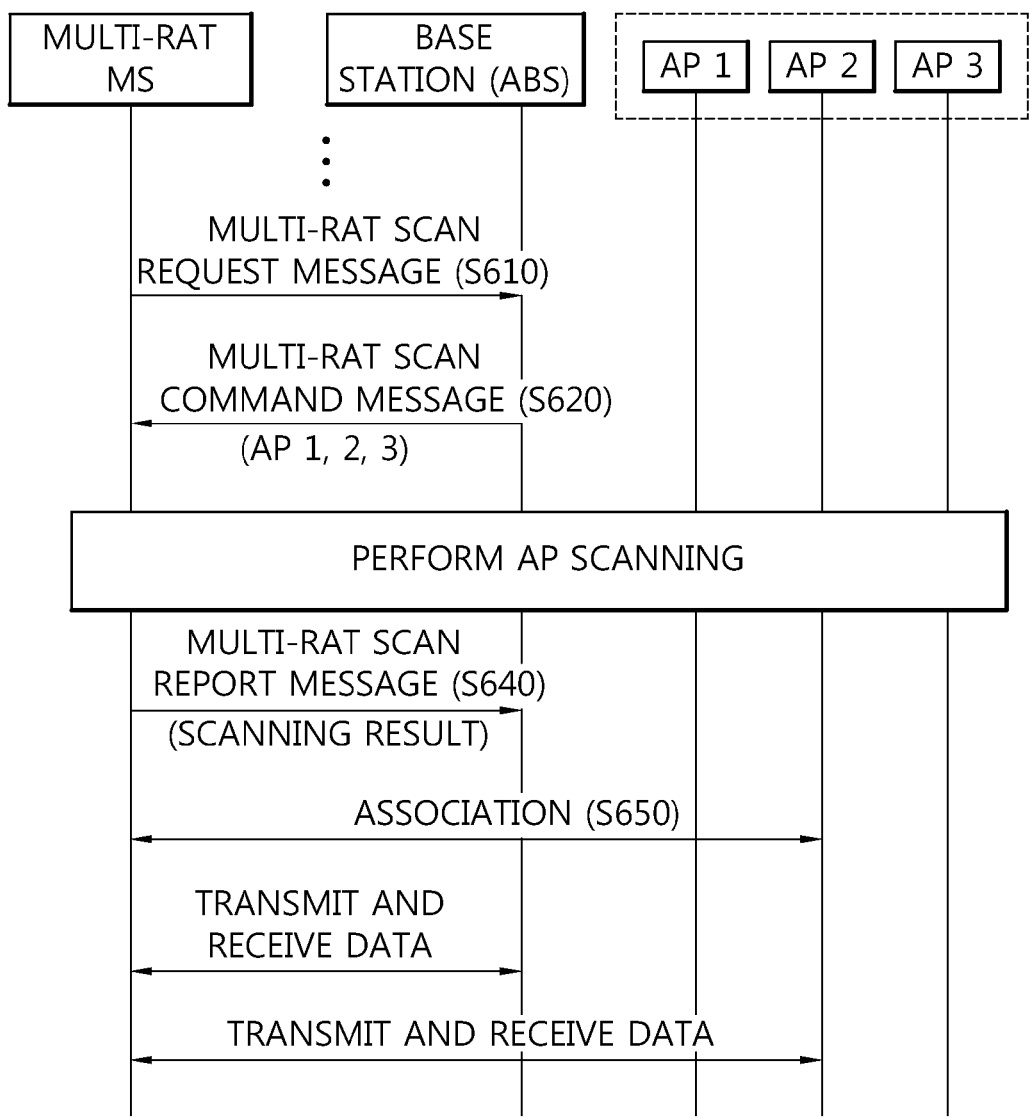

METHOD AND DEVICE FOR TRANSMITTING AND RECEIVING DATA IN RADIO ACCESS SYSTEM THAT SUPPORTS MULTI-RADIO ACCESS TECHNOLOGY

BACKGROUND OF THE INVENTION

1. Field of the Invention

The present invention relates to a radio access system supporting multi-radio access technology (RAT) and, more particularly, to a method and apparatus for transmitting and receiving data over two or more heterogeneous networks.

2. Related Art

In a conventional radio communication environment supporting two or more heterogeneous networks, although a terminal has capabilities to access multi-RAT, the terminal is unable to access the multi-RAT at the same time and transmit and receive data to and from the two or more heterogeneous networks at the same time.

That is, a conventional terminal supporting multi-RAT accesses any one RAT based on switching and transmits and receives data over one network. Accordingly, if a terminal having multi-RAT capabilities transmits and receives data over a specific network and transmits and receives data over a network different from the specific network, the transmission and reception of data over any one network is stopped.

Accordingly, in the prior art, a terminal having capabilities supporting two or more heterogeneous networks is able to perform communication by using different networks, but efficiency is limited because the terminal operates based on simple switching.

Furthermore, since different networks independently operate, an inefficient operation is performed from a viewpoint of the overall flow management of a terminal.

SUMMARY OF THE INVENTION

In order to solve the above problems, overall contents regarding a multi-radio access technology (RAT) capability negotiation process procedure between a mobile station (MS), having a multi-RAT capability, and a base station that instructs an overall control operation necessary for the MS to transmit and receive data over 2 or more networks at the same time have been defined currently, but detailed contents and method of each operation have not been defined.

In particular, it is clear that a multi-RAT MS must perform a scanning procedure on a secondary system in order to transmit and receive data to and from heterogeneous networks, that is, a primary system and the secondary system at the same time, but there is no detailed solution regarding that the a multi-RAT MS has to perform scanning on the secondary system through what method.

Accordingly, the present invention provides defining trigger metric and scanning-related information necessary for a multi-RAT MS to perform scanning on a secondary system and defining a method of transmitting results of the performing scanning on the secondary system to a primary system.

In an aspect, a method of transmitting and receiving, by a mobile station (MS), data to and from a first base station supporting first radio access technology (RAT) and a second base station supporting second RAT in a radio access system supporting multiple RATs is provided. The method includes receiving a first message, instructing scanning on the second base station, from the first base station, the first message comprising control information necessary to perform the scanning on the second base station, performing the scanning on the second base station based on the control information, and transmitting a multi-RAT scan report message, comprising results of the scanning on the second base station, to the first base station.

Further, the control information may comprise at least one of a basic service set (BSS) type, a basic service set identifier (BSSID), a service set identifier (SSID), a scan type, probe delay, channel list information, a minimum time used in each channel when scan is performed (MinChannelTime), a maximum time used in each channel when scan is performed (MaxChannelTime).

Further, the multi-RAT scan report message may comprise at least one of a BSS description set for indicating a scan request result (BSSDescriptionSet) and information for indicating a scan request result obtained from a channel measurement pilot.

Further, the method may further include performing a dynamic service addition (DSA) process for adding a service flow with the first base station.

Further, the scanning on the second base station may be performed when a service flow is generated through the DSA process.

Further, the method may further include receiving trigger information related to the performing of the scanning on the second base station from the first base station.

Further, the trigger information may comprise a trigger condition for triggering operations related to the performing of the scanning on the second base station, and a trigger action field indicating operations related to the performing of the scanning on the second base station according to the trigger condition.

Further, the operations related to the performing of the scanning may comprise a start of the scanning on the second base station or a report on the performing of the scanning on the second base station.

Further, indication information indicating a preference system for a newly generated service flow may be transmitted or received through a message exchanged with the first base station through the DSA process.

Further, the trigger information may be defined for each of second base stations located near the first base station or may be defined for each service flow generated through the DSA process.

Further, the method may further include receiving indication information indicating whether or not the operations related to the scanning are to be performed according to the trigger condition from the first base station.

Further, the method may further include transmitting a multi-RAT scan request message for requesting the scanning on the second base station to the first base station.

Further, the transmitting the multi-RAT scan request message may include performing the scanning on second base stations located near the first base station, and transmitting results of the scanning on the second base stations located near the first base station and information about a preference second base station through the multi-RAT scan request message.

In another aspect, a mobile station for transmitting and receiving data to and from a first base station supporting first radio access technology (RAT) and a second base station supporting second RAT in a radio access system supporting multiple RATs is provided. The mobile station includes a radio frequency unit for transmitting and receiving radio signals to and from an outside, and a controller coupled with the radio frequency unit, and configured for controlling the radio frequency unit to receive a first message, instructing scanning on the second base station, from the first base station, the first message comprising control information necessary to perform the scanning on the second base station, performing the scanning on the second base station based on the control information, and controlling the radio frequency unit to transmit a multi-RAT scan report message, comprising results of the scanning on the second base station, to the first base station Further, the controller may be configured for performing the scanning on the second base station when a service flow is generated through a dynamic service addition (DSA) process with the first base station.

The present invention is advantageous in that a multi-RAT MS can efficiently perform a scanning procedure on a secondary system by defining trigger metric and scanning-related information necessary for the multi-RAT MS to scan the secondary system and by defining a method of transmitting the results of the scanning on the secondary system to a primary system.

BRIEF DESCRIPTION OF THE DRAWINGS

FIGS. 1(a) and 1(b) are conceptual diagrams showing a multi-RAT network to which an embodiment of the present invention can be applied.

FIG. 2 is a flowchart showing a method of a multi-RAT MS transmitting and receiving data through a primary system and a secondary system.

FIG. 3 is a flowchart showing a scanning procedure of a multi-RAT MS according to a first embodiment of the present invention.

FIG. 4 is a flowchart showing a scanning procedure of multi-RAT MS according to a second embodiment of the present invention.

FIG. 5 a flowchart showing a scanning procedure of a multi-RAT MS according to a third embodiment of the present invention.

FIG. 6 is another flowchart showing a scanning procedure of a multi-RAT MS according to the third embodiment of the present invention.

DESCRIPTION OF EXEMPLARY EMBODIMENTS

Figure 1B:
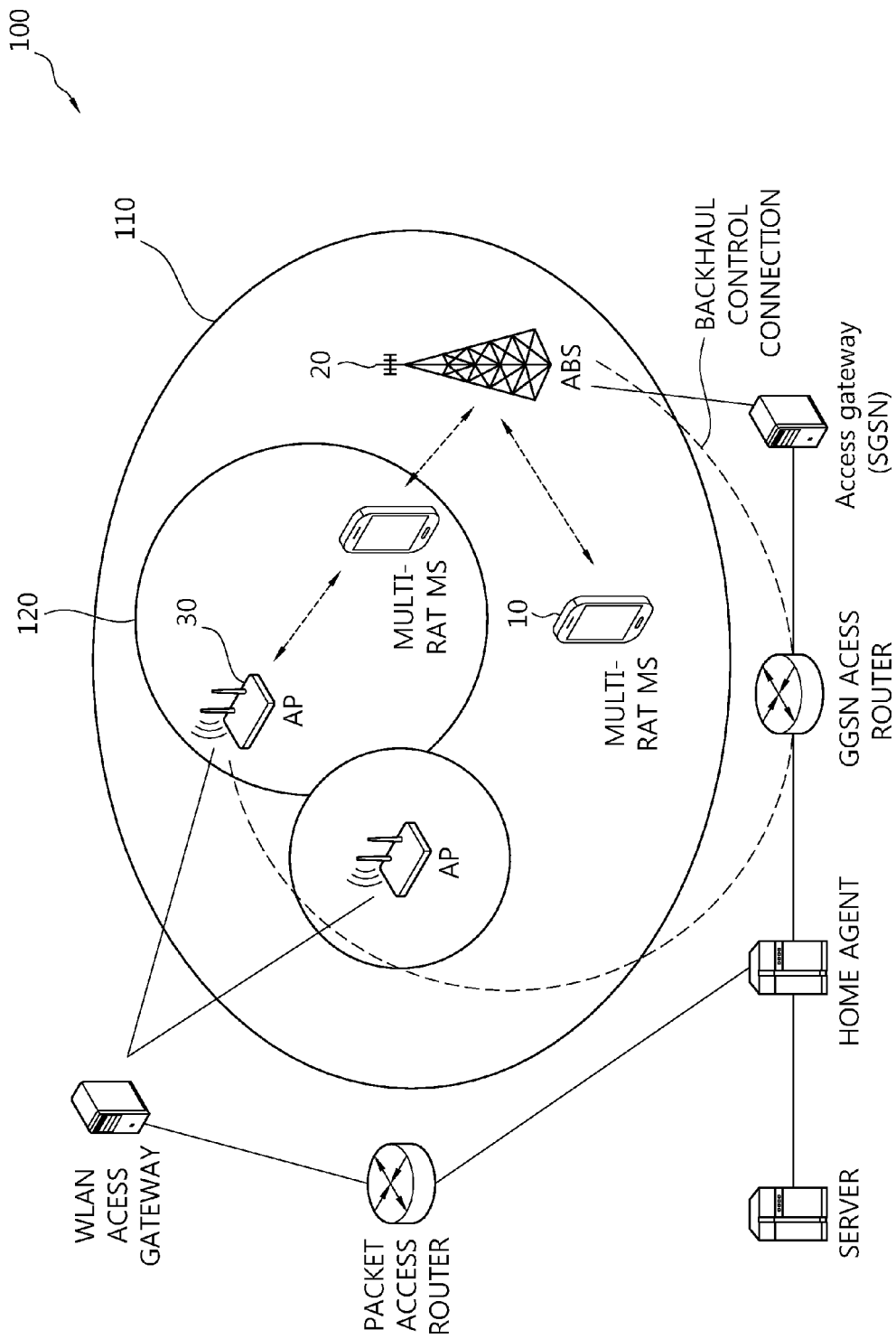

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

A method in which a mobile station (MS) accesses two or more heterogeneous networks (or multi-RAT) and transmits and receives data over the networks at the same time in a multi-RAT network according to an embodiment of the present invention is described below.

At first, a multi-radio access technology (multi-RAT) network according to an embodiment of the present invention is described.

FIGS. 1(a) and 1(b) are conceptual diagrams showing a multi-RAT network to which an embodiment of the present invention can be applied.

A multi-radio access technology (hereinafter referred to as 'multi-RAT') network refers to a radio communication environment in which two or more heterogeneous networks are present and an MS is able to access two or more heterogeneous networks and perform communication at the same time.

Here, an MS capable of performing communication with the two or more heterogeneous networks at the same time is called a 'multi-RAT MS' or 'a multi-system MS'.

A heterogeneous network (or a heterogeneous system) refers to a network using a communication method different from a communication method used in a specific network on the basis of the specific network.

For example, a WiMAX network, that is an example of a mobile communication system, and a Wi-Fi network using a Wi-Fi network, corresponds to heterogeneous networks.

RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

As shown in FIG. 1, a multi-RAT network 100 can include a primary system 110 and a secondary system 120.

Here, the primary system 110 and the secondary system 120 can be represented by a first network and a second network, respectively. The primary system 110 can include a multi-RAT MS 10, a base station 20, and the secondary system 120, and the secondary system 120 can include the multi-RAT MS 10 and an AP 30.

The primary system is a system having a wide range of coverage and can be a mobile communication system. For example, the primary system can be a WiMAX or LTE (-A) system. Furthermore, the primary system refers to a system always having a status with the multi-RAT MS. That is, the primary system refers to a system which maintains an activation state, a sleep mode state, or an idle mode state with the multi-RAT MS.

The secondary system is a system having a small range of coverage and can be a WLAN communication system. For example, the secondary system can be a Wi-Fi system. That is, the secondary system refers to a system that can be added to or deleted from the multi-RAT network if necessary. Furthermore, the secondary system can be used for the transmission and reception of data which basically requires a higher bandwidth (BW). Accordingly, a specific flow (QoS) can be mapped for the use of the secondary system.

Here, a base station of the secondary system, for example, an access point (AP) can operate like an MS having capabilities capable of communicating with the primary system.

Furthermore, in a multi-RAT network, the primary system and the secondary system are associated with each other in a wired or wireless manner. That is, a base station in the primary system and a base station in the secondary system can be associated with each other over a backbone network (FIG. 1(b)) can be associated with each other wirelessly (FIG. 1(a)).

Hereinafter, it is assumed that the primary system is a WiMAX system and a secondary system is a Wi-Fi system unless otherwise described, for convenience of description. Accordingly, a base station corresponding to the primary system is called an 'ABS', and a base station corresponding to the secondary system is called an 'AP'. Furthermore, access to the primary system can be used as the same meaning as access to the ABS, and access to the secondary system can be used as the same meaning as access to the AP.

FIG. 2 is a flowchart showing a method of a multi-RAT MS transmitting and receiving data through a primary system and a secondary system.

Referring to FIG. 2, the multi-RAT MS performs an initial network entry process with the ABS (S210).

The multi-RAT MS sends an indicator, indicating that the multi-RAT MS is an MS supporting multi-RAT, to the ABS through the initial entry process with the ABS. Here, the indicator can be a multi-RAT MS capability field. Furthermore, the indicator, that is, the multi-RAT MS capability field, can have a size of one bit.

Furthermore, the indicator can be transmitted through a registration procedure performed during the initial network entry process with the ABS. In this case, the indicator can be transmitted to the ABS through a registration request or registration response (REG-REQ/RSP) message.

For example, when the indicator is set to '1', it indicates that an MS is an MS supporting multi-RAT. When the indicator is set to '0', it indicates that an MS is an MS not supporting multi-RAT.

Furthermore, when an REG-REQ message or an REG-RSP message including the indicator (e.g., set to '1') indicating capabilities supporting multi-RAT is received from the multi-RAT MS, the ABS may send information, notifying that an additional multi-RAT capability negotiation process for supporting the multi-RAT MS will be performed, to the multi-RAT MS after the initial network entry process is finished or after a lapse of some time.

For example, when the notification information is set to '1', it indicates that the ABS and the multi-RAT MS perform an additional capability negotiation process in order to support multi-RAT. When the notification information is set to '0', it indicates that an additional capability negotiation process does not need to be performed.

Next, if the multi-RAT MS finishes the initial network entry process with the ABS, the multi-RAT MS and the ABS perform a multi-RAT capability negotiation process (S220).

Here, the multi-RAT capability negotiation process is commonly performed after a network (re)entry process is finished, but can be performed during a network (re)entry process with the ABS.

For example, if the multi-RAT capability negotiation process is performed during the network (re)entry process, the multi-RAT MS and the ABS can perform the multi-RAT capability negotiation process through the registration procedure process of the ABS and the multi-RAT MS. In this case, the multi-RAT MS and the ABS transmit and receive pieces of information regarding a multi-RAT capability negotiation through REG-REQ/REG-RSP messages.

The multi-RAT capability negotiation process of the multi-RAT MS and the primary system are described in more detail later.

Next, the multi-RAT MS performs an AP scanning process for access to the secondary system based on information related to the secondary system received from the ABS (S230).

Here, the multi-RAT MS performs a scanning process on neighbor APs periodically or in an event-triggered way for access to the secondary system.

First, it is assumed that association with all data transmitted to the multi-RAT MS is performed through a dynamic service (DSx) procedure with the ABS of the primary system and communication with the secondary system of the multi-RAT MS sends data regarding a specific flow to the secondary system under the determination of the ABS of the primary system.

The AP scanning process of the multi-RAT MS for access to the secondary system can be performed through a process of performing scanning on APs neighbor to the ABS and reporting a result of the scanning on the APs neighbor to the ABS to the APs through FIGS. 3 to 6. The AP scanning process of the multi-RAT MS is described in more detail with reference to FIGS. 3 to 6.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the access procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the ABS selects an AP that the multi-RAT MS accesses and checks the state of the selected AP before transmitting the acknowledgement response to the access to the secondary system to the multi-RAT MS. If, as a result of the check, the access to the selected AP is possible, the ABS can send information about the multi-RAT MS to the selected AP in advance.

Furthermore, when the ABS sends the acknowledgement response to the multi-RAT MS, the ABS can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the scanning on the AP for the access to the secondary system, the multi-RAT MS may request access to the secondary system to the ABS of the primary system.

A message necessary for the management procedure of the secondary system can include the following messages.

1. A secondary system request (SS_REQ) message
: is used for the multi-RAT MS to request access to the AP.
2. A secondary system command (SS_CMD) message
: is a message used to manage access to the AP and is used for association, disassociation, or re-association with or from the AP.
3. A secondary system indication (SS_IND) message
: is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

A multi-RAT capability negotiation process between the multi-RAT MS and the ABS is described in detail below.

As described above, the multi-RAT capability negotiation process between the multi-RAT MS and the ABS is performed after network (re)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the ABS.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the ABS can send information related to the secondary system to the multi-RAT MS. That is, if the ABS has common information about the APs of the secondary system that have to be received by the multi-RAT MS, the ABS can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the ABS does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the ABS. The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the ABS sends a multi-system capability response message to the multi-RAT MS in response to the multi-system capability request message.

The multi-system capability response message can include information about candidate APs.

Furthermore, if the multi-RAT MS enters idle mode, the ABS can store information, obtained through the multi-RAT capability negotiation process with the multi-RAT MS, for a certain time. That is, the ABS can newly define a multi-RAT information retention timer, can store the obtained information until the multi-RAT information retention timer expires, and can discard the obtained information after the timer expires.

Accordingly, if the multi-RAT MS performs network re-entry with the ABS before the multi-RAT information retention timer expires, the multi-RAT capability negotiation process can be omitted.

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the ABS, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described.

In order to access the secondary system, the multi-RAT MS or the ABS can perform a multi-RAT association request. In this case, the multi-RAT MS or the ABS can perform a multi-RAT association request process through a secondary system access request/response message.

If a secondary system is added at the request of the multi-RAT MS, when the multi-RAT MS detects the secondary system satisfying a specific condition by performing scanning, the multi-RAT MS can request association with the secondary system to the ABS by sending a secondary system request message to the ABS.

Furthermore, if a secondary system is added at the request of the ABS, when the ABS detects that specific flow association is generated in the multi-RAT MS, the ABS checks the state of an AP that can be accessed to the multi-RAT MS.

If, as a result of the check, access to the multi-RAT MS is possible, the ABS can instruct association between the multi-RAT MS and the secondary system by sending a secondary system access command message to the multi-RAT MS.

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key).

Next, the multi-RAT MS completes access to a specific AP and a traffic stream (TS) configuration with reference to AP information within the secondary system command message in response to an access command of the secondary system of the ABS. For example, an ADDTS request/response process of 802.11e can be performed.

Next, the multi-RAT MS informs the ABS of a result of an association success for the specific AP.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow.

That is, in the case of DL data, the ABS sends the DL data to the multi-RAT MS through the AP.

Furthermore, in the case of UL data, data for a specific flow ID indicated by the ABS is transmitted through the secondary system, for example, over a WLAN.

Furthermore, the multi-RAT MS can perform re-association or disassociation with the AP by transmitting and receiving the secondary system command/indication messages to and from the ABS.

Furthermore, if the multi-RAT MS gets out of the secondary system, for example, a WLAN coverage while transmitting and receiving data to and from the AP and there is no neighbor AP nearby, the ABS can control seamless flow mobility between the AP and the ABS so that the data transmitted to and received from the AP is seamlessly transmitted through the ABS of the primary system.

Furthermore, if the multi-RAT MS detects a neighbor AP while transmitting and receiving data to and from the AP of the secondary system, the ABS can perform control so that the data now being transmitted to and received from the multi-RAT MS is seamlessly transmitted from the AP to the neighbor AP.

A method of releasing (or disassociating) the secondary system is described below.

If the multi-RAT MS determines that a channel state with the secondary system now being accessed thereto is not good, the multi-RAT MS performs scanning on neighbor secondary systems.

If the multi-RAT MS determines that there is no detected secondary system as a result of the scanning into the neighbor secondary systems, the multi-RAT MS disassociates the secondary system now being accessed thereto.

In this case, if data corresponding to a specific flow of the primary system is being transmitted and received through the secondary system and the MS is unable to perform an HO to a neighbor AP secondary system, the ABS has to support multi-RAT seamless flow mobility so that seamless flow mobility can be performed without a data loss for the corresponding flow.

Or, in this case, when the multi-RAT MS completes the transmission of data transmitted to and received from the secondary system, the ABS can release association with the secondary system.

The re-association (e.g., a handover to a neighbor AP) of the secondary system is described below.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the base station can release association with the secondary system now being accessed thereto and request a handover (HO) to another secondary system.

That is, the ABS informs the multi-RAT MS that there is no longer data transmitted and received through a current serving secondary system by sending an SS-CMD message to the multi-RAT MS. Next, the ABS instructs the multi-RAT MS to transmit and receive existing transmitted data through the primary system. If the transmission of the existing data is completed, the ABS instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the base station can instruct the multi-RAT MS not to access the secondary system although the multi-RAT MS has entered the coverage of the secondary system. That is, this management of the secondary system can be performed based on the speed of the multi-RAT MS.

A scanning procedure of a multi-RAT MS for a secondary system (second base station) which is proposed according to embodiments of the present invention is described in detail in connection with embodiments.

First Embodiment

The first embodiment provides a method of a multi-RAT MS performing scanning on a second base station (or secondary system) by receiving a multi-RAT scan command message from a first base station (or primary system).

Hereinafter, the first base station is called an 'ABS' and the second base station is called an 'AP', for convenience of description.

That is, the first embodiment defines information included in a multi-RAT scan command message indicating a scanning command for an AP by a multi-RAT MS and defines information that must be transmitted to an ABS after performing scanning on the AP.

FIG. 3 is a flowchart showing a scanning procedure of a multi-RAT MS according to a first embodiment of the present invention.

The steps S210, S220, and S240 of FIG. 2 are also applied to the first embodiment to be described below. Accordingly, only the scanning procedure of the multi-RAT MS is described below.

Referring to FIG. 3, if the ABS determines that the multi-RAT MS needs to communicate with the AP (e.g., the position/speed of the multi-RAT MS), the ABS transmits a multi-RAT scan command message (AAI_MultiRAT-SCN-CMD), including AP scan-related control information, to the multi-RAT MS in order to instruct the multi-RAT MS on the scanning of the AP (S310).

Here, the multi-RAT scan command message may also be called a scan request message.

The AP scan-related control information is used to help the multi-RAT MS to detect an AP and may be parameters, such as those described below. The AP scan-related control information may further include pieces of information included in a message that is used for a base station to instruct an MS on a scan command in an IEEE 802.16 system or LTE (-A) system (e.g., AAI_SCN-RSP message), in addition to the following parameters. In this case, a beacon interval defined in an 802.11 system can be transmitted through the multi-RAT scan command message instead of a scan interval.

That is, the AP scan-related control information can include at least one of a basic service set (BBS) type, a basic service set identifier (BSSID), a service set identifier (SSID), ScanType, ProbeDelay, ChannelList, MinChannelTime, MaxChannelTime, RequestInformation, and VendorSpecificInfo.

Here, the multi-RAT MS can stop a data transmission/reception process though the ABS during the scan interval or the beacon interval received from the ABS in order to mitigate interference. In this case, the multi-RAT MS may stop only UL transmission to the ABS or stop both DL and UL transmission to the ABS.

Here, the multi-RAT MS transmits the AP scan-related control information to 802.11 MAC.

Next, the multi-RAT MS performs scanning APs neighbor to the ABS based on the AP scan-related control information received from the ABS (S320).

Next, the multi-RAT MS transmits (or reports) a result of the scanning to the ABS according to a scan result reporting condition included in the multi-RAT scan command message (S330).

Here, the result of the scanning can be transmitted to the base station periodically, once, or according to a scan reporting trigger condition depending on contents included in the multi-RAT scan command message.

Here, the result of the scanning transmitted by the multi-RAT MS can be transmitted to the ABS through a multi-RAT scan response message (or scan check message).

In this case, the multi-RAT scan response message can include pieces of information (or parameters), such as those described below.

: BSSDescriptionSet for indicating a result of a scan request

: BSSDescriptionFromMeasurementPilotSet for indicating a result of the scan request obtained from a channel state measurement pilot : ResultCode for indicating a result of MLMESCAN confirmation primitive : VendorSpecificInfo Second Embodiment The second embodiment provides a method of multi-RAT MS performing scanning on a second base station by using a trigger condition (or scanning-related trigger condition) received from a first base station.

The first base station is called an 'ABS' and the second base station is called an 'AP', for convenience of description.

That is, the second embodiment provides a method of multi-RAT MS performs a scanning process on an AP using a trigger condition (or scanning trigger information) newly defined by an ABS.

Accordingly, a multi-RAT MS (having both 802.16 and 802.11 MAC/PHY) performs scanning on an AP and reports results of the scanning on the AP if a specific condition is satisfied without transmitting and receiving an additional message for triggering the scanning or a report on the results of the scanning to and from an ABS by using a trigger condition newly defined by the ABS.

FIG. 4 is a flowchart showing a scanning procedure of multi-RAT MS according to a second embodiment of the present invention.

The steps S210, S220, and S240 of FIG. 2 are also applied to the second embodiment to be described below. Accordingly, only the scanning procedure of the multi-RAT MS is described in more detail below.

Referring to FIG. 4, the multi-RAT MS receives a first message, including a trigger condition from an ABS (S410). Here, the trigger condition can be a trigger condition defined for operations related to the scanning between the ABS and the multi-RAT MS, but preferably is a new trigger condition defined for operations related to the scanning between an AP and the multi-RAT MS. Here, the operation related to the scanning can be a scanning performing, a scanning report, etc., and the scanning is performed along with the AP, and the scanning report is performed along with the ABS.

Furthermore, the first message can be a system configuration descriptor message (AAI_SCD), an neighbor advertisement message (AAI_NBR-ADV), a superframe header (SFH), a multi-carrier advertisement message (AAI_MC-ADV), a PGID-info message transmitted to an idle mode MS, or a multi-RAT-related broadcast message (e.g., multi-RAT_NBR-ADV), such as a paging advertising (PAG-ADV) message.

For another example, the first message can include AP-specific trigger information (or trigger definition) having various sizes.

Furthermore, if the metric of the start of scanning by the multi-RAT MS for the AP is an MS-specific value, the trigger condition can be transmitted to each MS in a unicast way.

The trigger condition can include a trigger action field (or parameter) and a trigger metric field.

The trigger action field is information instructing the start of scanning or a report on results of the scanning. Here, a value indicating the start of scanning can be omitted.

Furthermore, the trigger metric field is information indicating a metric for 1) the start of scanning and 2) a report on the results of the scanning that are defined in the trigger action field.

First, the specific condition on the start of scanning of the multi-RAT MS can correspond to a case where traffic desired to be transmitted to the AP is generated through a dynamic service addition (DSA) process or where the AP is selected as a preference system through the DSA process.

That is, if traffic desired to be transmitted through the AP is defined in a multi-RAT capability negotiation process between the ABS and the multi-RAT MS and the defined traffic is generated through the DSA process between the ABS and the multi-RAT MS, the multi-RAT MS can start scanning on the AP (S420).

Or, if IEEE 802.11 (WLAN, AP) is selected as a preference system (or preference base station) for a service flow added in the DSA process between the ABS and the multi-RAT MS, the multi-RAT MS can start scanning on APs neighbor to the ABS (S420).

Accordingly, the start of scanning on the AP by the multi-RAT MS can be determined by a service flow or traffic added (or generated) through the DSA process between the ABS and the multi-RAT MS.

That is, traffic or QoS characteristics configured through the DSA message can be used as the metric of the start of scanning.

Next, the following can be defined as metric for a report on the results of scanning 1) The metric of a neighbor AP is greater than an absolute value, 2) the metric of a neighbor AP is smaller than an absolute value, 3) the metric of a neighbor AP is relatively smaller than the metric of an ABS, and 4) the metric of a neighbor AP is relatively greater than the metric of an ABS.

For another example, the trigger condition can be defined in an AP-specific way. That is, trigger related to the scanning on the AP by the multi-RAT MS can be defined in an AP-specific way.

In this case, the above-described trigger condition can be defined for each of APs neighbor to the ABS or can be defined as a different value depending on a service flow characteristic (or traffic characteristic).

Here, if the trigger condition is defined according to a service flow or traffic characteristic, the trigger condition can be transmitted in a unicast way.

In the service flow, a QoS parameter is defined through the DSA process, and a necessary trigger condition may be different depending on an actually transmitted traffic characteristic although QoS types are the same.

For example, if the service flow characteristic is voice traffic, preference is given to communication over a cellular network (primary system, first base station, ABS). If a WLAN (secondary system, second base station, AP) has an excellent channel state, preference can be given to communication over the WLAN.

Furthermore, in the case of data traffic, preference may be given to communication over a WAN rather than communication over a cellular network although an AP has weak signal intensity.

Accordingly, since a threshold value of a scanning or a scanning report can be different according to a service flow or data characteristic, trigger definitions according to a traffic characteristic may need to be transmitted.

Examples of a message format including a trigger condition that is defined in an AP-specific way are described below with reference to Tables 1 to 4 below.

Table 1 below shows an example of a system configuration descriptor (AAI_SCD) message format including an AP-specific (Secondary System (SS)-Specific) trigger definition.

TABLE 1

| Field | Size (bits) | Value/Description | Condition |
|---|---|---|---|
| SS-specific Trigger definitions | variable | Secondary System-specific triggers with encoding defined in Table 5-SS-specific Trigger description. | Present for different traffic characteristics |

Table 2 shows an example of a multi-RAT neighbor advertisement (MultiRAT_NBR-ADV) message format including an AP-specific (Secondary System (SS)-Specific) trigger definition.

TABLE 2

| Field | Size (bits) | Value/Description | Condition |
|---|---|---|---|
| SS-specific Trigger definitions | variable | Secondary System-specific triggers with encoding defined in Table 5-SS-specific Trigger | OptionalPresent for different traffic characteristics when the corresponding secondary system is required to apply different trigger condition from definitions of AAI-SCD message. |

Table 3 below shows an example of a DSA request/response (DSA-REQ/RSP) message format including an AP-specific (Secondary System (SS)-Specific) trigger definition.

TABLE 3

| Field | Size (bits) | Value/Description | Condition |
|---|---|---|---|
| FID | 4 | Flow identifier | Present when an ABS initiates AAI-DSAREQ |
| Preferred system | 1 | Indicates a preferred system0b0: WiMAX (communication via ABS)0b1: WLAN (communication via AP) | OptionalPresent when the AMS supports Multi-RATs. |
| If (Preferred system=1) SS-specific Trigger definitions | variable | Secondary System-specific triggers with encoding defined in Table 5-SS-specific Trigger description. | OptionalPresent when the preferred system is WLAN and the corresponding secondary system is required to apply different trigger condition from definitions of AAI-SCD message. |

Table 4 below shows an example of a multi-RAT scan command (MultiRAT-SCN-CMD) message format including an AP-specific (Secondary System (SS)-Specific) trigger definition.

TABLE 4

| Field | Size (bits) | Value/Description | Condition |
|---|---|---|---|
| Report mode | | 0b00: No report0b01: Periodic report0b10: Event-triggered report0b11: One-time scan report | |

TABLE 4-continued

| Field | Size (bits) | Value/Description | Condition |
|---|---|---|---|
| Num of flows | | Number of active flows | OptionalPresent when the AMS supports Multi-RATs. |
| for (i=0;i++;i<Num of flows) | | | |
| FID | | Flow identifier | |
| SS-specific trigger definitions | | Secondary System-specific triggers with encoding defined in Table 5- SS-specific Trigger description. | OptionalPresent when the Report mode is 0b10 and the corresponding secondary system is required to apply different trigger condition from definitions of AAI-SCD message. |
| } | | | |

Referring to Table 4, since the MultiRAT-SCN-CMD message is an MS-specific value and a trigger definition is a flow-specific value, the trigger definitions are defined for each flow in the MultiRAT-SCN-CMD message.

Furthermore, referring to Table 3, if a parameter for informing the preferred system of a flow generated through a DSA process is defined within the DSA-REQ or DSA-RSP message and a value of the parameter is a WLAN, trigger definitions for the WLAN can be included in the DSA-REQ or DSA-RSP message.

Furthermore, the ABS can define an AP-related trigger condition that defines a case where the multi-RAT MS reports the results of scanning on the AP, to the ABS.

Here, the definition of the trigger condition for reporting a result of scanning on the AP can be given as in Table 5 below.

TABLE 5

| Name | Length (bits) | Value |
|---|---|---|
| Number of conditions | 2 | The number of conditions that are included in this trigger (see loop definition below). When more than one condition is included, this trigger is referred to as a complex trigger and is the logical AND combination of all the included conditions. |
| for (i=0; i<= Number of conditions; i++){ | | |
| Type/Function/Action | 3 | See Table 6-for description |
| Trigger Value | 8 | Trigger value is the value used in comparing measured metric for determining a trigger condition. |
| Trigger averaging parameter | 4 | The averaging parameter used for averaging this trigger metric according to equation (4). If not present, the default trigger averaging parameter in AAI-SCD is used.0x0: 10x1: 1/20x2: 1/40x3: 1/80x4: 1/160x5: 1/320x6: 1/640x7: 1/1280x8: 1/2560x9: 1/5120xA to 0xF: reserved |
| { | | |

A Type/function/action field for the AP-specific trigger condition in Table 5 can be given as in Table 6 below.

TABLE 6

| Name | Size (bits) | Value | Description |
|---|---|---|---|
| Type | 1 (MSB) | Trigger metric type: 0x0: CINR metric0x1: RSSI metric | |
| Function | 1 | Computation defining scanning and reporting trigger condition: 0x0: Metric of neighbor AP is greater than absolute value0x1: Metric of/ neighbor AP is less than absolute value0x2: Metric of neighbor AP is less than S-ABS metric by relative value 0x3: Metric of neighbor AP is greater than S-ABS metric by relative value | |
| Action | 1 (LSB) | Action performed upon reaching trigger condition: 0b0: Respond on trigger with AAI_SCN-REP for neighbor AP0b1: reserved | Action 0b0 applies to Function 0x0 and 0x1. |

Here, if a trigger for the report on the result of scanning on the AP by the multi-RAT MS is defined as Table 6 and the ABS determines that the multi-RAT MS needs to access the AP (second base station, secondary system), the ABS can trigger scanning on the APs within the coverage of the ABS by transmitting the multi-RAT scan command message to the multi-RAT MS.

Furthermore, the ABS can transmit trigger parameters for a scanning report on each AP through an AAI-NBR-ADV, AAI-MC-ADV, AAI_SCD, or MultiRAT-ADV message.

In this case, the multi-RAT MS performs scanning on the APs (S430). If trigger parameters for the scan report transmitted through the above-described messages are satisfied (S440), the multi-RAT MS can transmit a scanning report to the ABS (S450).

Furthermore, the multi-RAT MS can receive results of the scanning, that is, indication information indicating whether or not a scanning report has to be performed according to the trigger condition defined above, through a multi-RAT capability negotiation process with the ABS.

Here, the indication information can be received from the ABS through the multi-RAT request/response (MultiRAT-REQ/RSP) message in the multi-RAT capability negotiation process. That is, the indication information can be included in the multi-RAT request/response message as a 'scan reporting indication by trigger condition field', and the size of the indication information can be represented by 1 bit.

Here, if an AP having very low signal intensity is detected while the multi-RAT MS performs scanning on the APs (in response to a scanning command from the ABS or for any reason), the indication information is transmitted to the multi-RAT MS because data can be transmitted and received through the detected AP.

Third Embodiment

The third embodiment provides a method of a multi-RAT MS performing a scanning procedure on a second base station 1) by requesting scanning on the second base station from the first base station, 2) through the start of scanning without a scanning instruction from a first base station.

The first base station is called an 'ABS' and the second base station is called an 'AP', for convenience of description.

FIG. 5 a flowchart showing a scanning procedure of a multi-RAT MS according to a third embodiment of the present invention.

The steps S210, S220, and S240 of FIG. 2 are also applied to the third embodiment to be described below. Accordingly, only the scanning procedure of the multi-RAT MS is described in detail below.

Particularly, FIG. 5 shows a method of performing scanning through the start of the multi-RAT MS without a scanning command instruction from an ABS and additionally receiving scanning-related information from the ABS for efficient scanning.

Referring to FIG. 5, the multi-RAT MS performs scanning on APs neighbor to the ABS (S510). Here, the start of scanning of the multi-RAT MS can be initiated when a service flow is generated through a DSA process described in the second embodiment. Here, in the service flow generated through the DSA process, communication with the AP can be previously defined or can be instructed through the DSA process.

Next, the multi-RAT MS transmits a first message (e.g., SS-REQ message) for requesting to join the APs to the ABS (S520). Here, the first message includes the result of the scanning on the APs performed at step S510 and information on an AP(s) with which connection is preferred.

Here, the ABS can determine a scanning command (or whether or not to perform scanning) that instructs the multi-RAT MS on the scanning of the AP(s) through information that is included in the first message received from the multi-RAT MS.

Here, if the ABS has determined that the multi-RAT MS should perform scanning on the APs again, the ABS transmits a multi-RAT scan command message to the multi-RAT MS (S530). Here, the multi-RAT scan command message includes information about an AP on which scanning will be performed. From FIG. 5, it can be seen that the AP on which the multi-RAT MS will perform scanning is an AP 2.

Next, the multi-RAT MS performs scanning on the AP 2 (S540) and transmits the results of the scanning to the ABS through a multi-RAT scan report message (S550).

Next, the multi-RAT MS performs an association procedure with the AP 2 and can transmit and receive data to and from the AP 2 through the ABS.

FIG. 6 is another flowchart showing a scanning procedure of a multi-RAT MS according to the third embodiment of the present invention.

The steps S210, S220, and S240 of FIG. 2 are also applied to the third embodiment to be described below. Accordingly, only the scanning procedure of the multi-RAT MS is described in detail below.

That is, FIG. 6 shows a method of the multi-RAT MS performing scanning on APs by requesting scanning from an ABS.

Referring to FIG. 6, the multi-RAT MS transmits a multi-RAT scan request message for requesting scanning on APs to the ABS (S610).

Next, the ABS transmits a multi-RAT scan command message for instructing to perform the scanning on APs (APs 1, 2, and 3) to the multi-RAT MS (S620).

Next, the multi-RAT MS performs scanning on the APs (APs 1, 2, and 3) (S630) and transmits the results of the scanning to the ABS through a multi-RAT scan report message (S640).

Next, the ABS determines an AP to be associated with the multi-RAT MS and transmits information about the determined AP (AP 2) to the multi-RAT MS.

Accordingly, the multi-RAT MS performs an association procedure with the determined AP (AP 2) (S650) and transmits and receives data.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 7.

Figure 7:
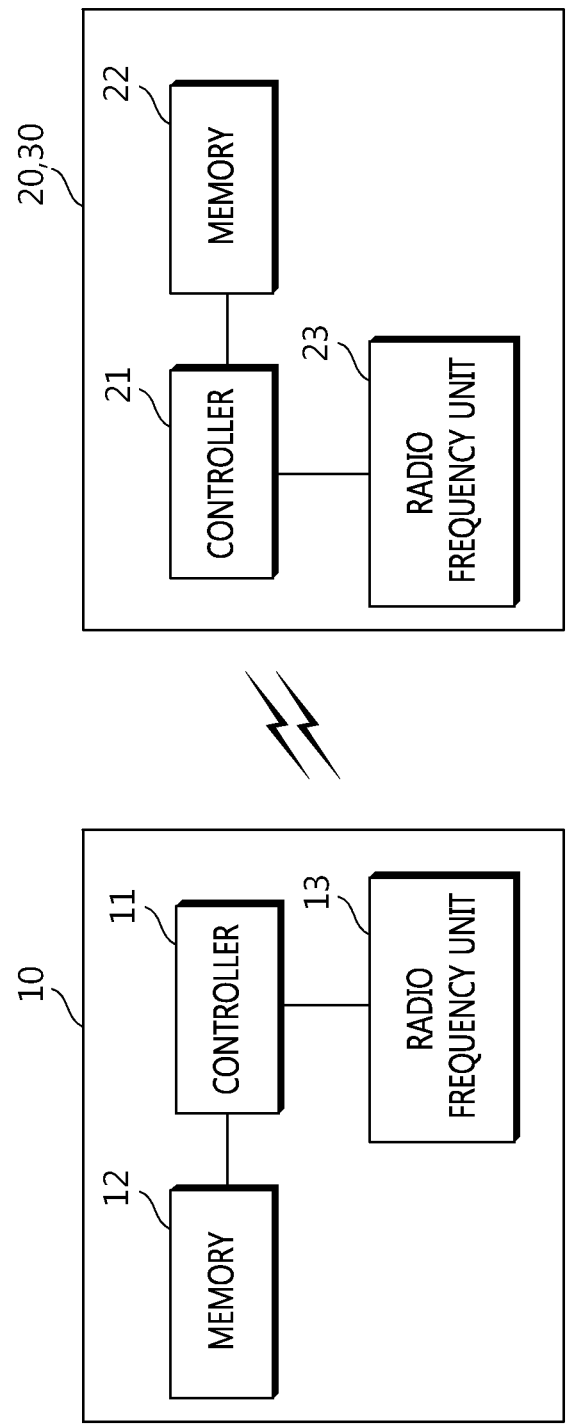
FIG. 7 is a block diagram showing internal structures of an MS and a BS in a wireless access system according to an embodiment of the present invention.

FIG. 7 is a block diagram showing internal structures of an MS and a BS in a wireless access system according to an embodiment of the present invention.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the multi-RAT MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20, 30 includes a controller 21, a memory 22, and an RF unit 23.

Here, the BS 20, 30 commonly refers to a fixed station communicating with the MS, and the base station can be called another terminology, such as a NodeB, a base transceiver system (BTS), or an access point. One or more cell can be present in one base station.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of transmitting and receiving, by a mobile station (MS), data to and from a first base station supporting a first radio access technology (RAT) and a second base station supporting a second RAT in a radio access system supporting multiple RATs, the method comprising:
receiving, by the MS, a message including a trigger condition for operating a scanning on the second base station;
performing, by the MS, the scanning on the second base station when the trigger condition included in the first message is satisfied,
wherein the trigger condition is satisfied when a service flow is generated through a dynamic service addition (DSA) process, and
wherein the DSA process is performed to add the service flow to the first base station; and
transmitting, by the MS, a multi-RAT scan report message that includes results of the scanning on the second base station.

2. The method of claim 1, wherein the message including the trigger condition is at least a system configuration descriptor message (AAI_SSC), an neighbor advertisement message (AAI_NBR-ADV), a superframe header (SFH), a multi-carrier advertisement message (AAI_MC-ADV), a PGID-info message, or a multi-RAT related broadcast message.

3. The method of claim 1, wherein the multi-RAT scan report message comprises at least one of a basic service set (BSS) description set for indicating a scan request result (BSSDescriptionSet) and information for indicating a scan request result obtained from a channel measurement pilot.

4. The method of claim 1, wherein the trigger condition includes a trigger action field indicating operations related to the performing of the scanning.

5. The method of claim/wherein the operations related to the performing of the scanning comprise a start of the scanning on the second base station or a report on the performing of the scanning on the second base station.

6. The method of claim 1, wherein indication information indicating a preference system for a newly generated service flow is transmitted or received through a message exchanged with the first base station through the DSA process.

7. The method of claim 1, wherein the trigger condition is defined for each of second base stations located near the first base station or is defined for each service flow generated through the DSA process.

8. The method of claim 1, further comprising transmitting a multi-RAT scan request message for requesting the scanning on the second base station to the first base station.

9. The method of claim 8, wherein the transmitting the multi-RAT scan request message comprises:
performing the scanning on second base stations located near the first base station, and
transmitting results of the scanning on the second base stations located near the first base station and information about a preference second base station through the multi-RAT scan request message.

10. A mobile station for transmitting and receiving data to and from a first base station supporting a first radio access technology (RAT) and a second base station supporting a second RAT in a radio access system supporting multiple RATs, the mobile station comprising:
a radio frequency unit for transmitting and receiving radio signals; and
a controller coupled with the radio frequency unit, and configured for:
receiving a message including a trigger condition for operating a scanning on the second base station;
performing the scanning on the second base station when the trigger condition included in the first message is satisfied,
wherein the trigger condition is satisfied when a service flow is generated through a dynamic service addition (DSA) process, and
wherein the DSA process is performed to add the service flow to the first base station; and
transmitting a multi-RAT scan report message including results of the scanning on the second base station.

* * * * *